3,785,969
METHOD OF AND APPARATUS FOR THE CONTINUOUS CONCENTRATION OF A DISPERSION CONTAINING SUSPENDED SOLID MATERIAL

Hans-Heinz Mölls, Leverkusen, Reinhold Hörnle, Cologne, Manfred Bücheler, Leverkusen, and Hans Raab and Joachim Adrio, Cologne, Germany, assignors to Bayer Aktiengesellschaft, Leverkusen, Germany
Filed Apr. 22, 1971, Ser. No. 136,460
Claims priority, application Germany, May 8, 1970, P 20 22 471.9
Int. Cl. B01d 17/10
U.S. Cl. 210—19                                    21 Claims

ABSTRACT OF THE DISCLOSURE

Suspended solid dispersions are guided under a pressure of 0.2 to 20 atm. above atmospheric through a gap which is a perforation, the solid dispersion, as viewed in direction perpendicular to said shells, being subjected to a drop in velocity. The supply takes place centrally and the filter cake is removed peripherally.

---

The present invention is concerned with a method of and an apparatus for continuously concentrating a dispersion containing suspended solid material, in which the dispersion is supplied to an end of the central region of a filtration zone enclosed by limiting surfaces spaced from the said region and extending with axial symmetry, and the dispersion is set in rotation and the liquid filtered off through at least one of the limiting surfaces, while the concentrate discharges at the other end of the filtration zone.

An apparatus for the extraction of water from fine grain material, more especially from fine coal, is known from German Patenschrift 881,181. It consists of two conical drum shells which rotate together and between which is provided a gap, through which the material from which water is to be removed travels during the filtration. This apparatus operates without the use of pressure on the principle of a centrifuge, the inner sheet metal drum provided with filter material being relieved of the load of the material by the effect of centrifugal force. In this way, the formation of a filter cake bed from the material to be dehydrated on the filter surface is intentionally avoided. Since the liquid contained in the material is also exposed to the centrifugal force, the efficiency of the apparatus is correspondingly low, since some of the liquid never reaches the filter surface.

The known methods and apparatus cause the breaking up of any filter cake bed. However, a definite filter cake bed is absolutely necessary if as complete a separation as possible of liquid and solid material is to achieve. In addition, the known methods and apparatus take no account of the gradual increase in concentration of the dispersion. The shearing forces which are effective vary independently of the gradual increase in concentration and thus independently of the increase in viscosity. At the point at which the filter cake has least fluidity for example, at the outlet, the movement is at times completely stopped, so that the solid substance of increased concentration thickens thixotropically and can clog the discharge opening.

The present invention has for its object to provide a method and an apparatus by which liquid dispersions of both high and low viscosity can be successfully increased in concentration.

As regards technical procedure, this is effected according to the invention by the dispersion to be concentrated being maintained in the filtration zone under a pressure which exceeds atmospheric by from 0.2 to 20 atmospheres the dispersion being subjected, as viewed perpendicularly to the limiting surfaces, to a drop in velocity.

The effect thereby obtained is that a defined filter cake bed is produced which has an optimum thickness adapted to the concentration process, corresponding to the progressive concentration of the dispersion over the length of the filtration zone. It is obvious that obtaining a filter cake bed of optimum thickness depends on various factors. These factors include, for example, the viscosity of the dispersion whose concentration is to be increased, the particle size of the solid suspended in the dispersion, and the specific gravities of the suspended solid and the liquid, etc. However, the filter cake bed is adaptable to these prescribed conditions by an optimum fall in velocity, an optimum dimension of the filtration zone and also a suitable superatmospheric pressure being respectively adjusted for the dispersion to be treated and for the condition of the dispersion in the respective region of the filtration zone.

The dispersions for which the method is especially suitable include aqueous dispersions of, for example inorganic or organic pigment dyestuffs, organic dispersion dyestuffs and other dyestuffs which are more or less difficultly soluble or are made difficultly soluble, plant-protection agents and insecticides, pharmaceutical compositions and foods. However, initial and intermediate products of all kinds can also be considered. Organic solvents as well as water can be used as the dispersion medium.

In one particular form of the invention, the thickness of the filtration zone is adjustable. The method has been found to be particularly efficient if a filter cake bed with a thickness of 0.2–20 mm. is maintained on the filtering boundary or limiting surfaces. For a pigment dyestuff dispersion, the mean value of the thickness of the filter cake bed should be from about 1 to about 2 mm. For plant-protection agents of coarser crystallinity, a bed with a thickness of 0.5 mm. may be sufficient.

It is particularly advantageous according to the invention for the thickness of the filter cake bed to be altered at times by varying the speed of rotation of the dispersion which is in the filtration zone and/or by altering the spacing of the two boundary surfaces. In this way, filter cake bed is renewed.

In another form of the method according to the invention, it has proved advantageous for the dispersion to be subjected in a manner known per se to a pulsation.

For most dispersions, for example, with crystalline products which are not too fine, it is advantageous to maintain the superatmospheric pressure at between 2 and 5 atmospheres.

Of particular importance within the scope of the invention is the choice of the drop in velocity in the filtration zone in the direction from one of the boundary surfaces to the other. This drop in velocity should be as great as possible, because the strength of the shearing force which is exerted on the dispersion is directly proportional to this drop in velocity. It is desired to obtain shearing forces which are as high as possible. The shearing forces are produced by the difference in speed of the boundary surfaces. In the simplest case, one of the boundary surfaces is stationary, while the other rotates at a prescribed speed. Alternatively, both boundary surfaces can be rotated in the same direction, but at different speeds. A particularly high drop in velocity is obtained by having the two boundary surfaces rotating in opposite directions.

The formation of the axially symmetrical filtration zone depends on the shape of the limiting or boundary surfaces. The shape of the boundary surfaces can be adapted to suit the dispersion which is to be treated and in the simplest cases these surfaces are formed in as conical or frusto-conical shells. The size of the cone angle is chosen according to the dispersion to be treated. It may in some cases be advantageous if the conical shell is stepped, so that there are sudden jumps in the drop in velocity. Alternatively the boundary surfaces may be so shaped that the filtration zone is in the form of a paraboloid of revolution or an ellipsoid of revolution or a similar geometrical form. The effect of the formation of the filter zone is that the peripheral velocity of the filter zone and thus the shearing force which is set up therein increases with increasing concentration of the dispersion. In other words, the operative shearing force is usually greatest at the outlet.

The apparatus according to the invention for carrying the method into effect is based on two cencentrically arranged, axially symmetrical sheet shells which enclose a gap and extend three-dimensionally from a central base, at least one of the shells having a perforation, and dispersion supply means being arranged on the central base, while the open end of the gap is formed to act as an annular discharge gap. The novel feature is that the discharge gap is formed as a sliding gap, by making one of the two shells with a rim flange at the discharge end, while the discharge end of the other shell is surrounded by an adjustable ring pointing towards the rim flange, and at least one of the shells is rotatably mounted and is provided with its own rotational drive means, and a high-pressure pump is provided in the supply pipe.

According to the invention, only one of the sheet shells need be perforated. Nevertheless, both shells can be provided with perforations, optionally only in certain regions. As regards the method of forming the filter surfaces, the prior art already offers many prototypes, of which the suitable ones can be used for the formation of the apparatus according to the invention. For example, the sheet shell can be formed as a perforated sheet, which is covered with a filter cloth. The shell may, however, instead be formed as a screening shell with a corresponding support construction. In similar manner, sintered metals or porous synthetic plastic plates can be used. The pores of the filter material should have a size which is in the range from 0.1 to $50\mu$, preferably from 1 to $10\mu$.

One of the shells is preferably mounted to be adjustable relatively to the other. In this way, the width of the gap can be adjusted.

According to another advantageous development, a pulsation pump is arranged in the dispersion supply pipe. Depending on the stroke and the frequency, it is then possible to impose a pulsation in the dispersion. The stroke and pulsation frequency are preferably adjustable.

According to another improvement of the apparatus according to the invention, baffle elements are arranged on the shells to face into the gap. The shells preferably comprise depressions, or those surfaces of the shells facing the gap are roughened. The effect achieved by these measures is that certain flows are developed in the gap or a defined filter cake bed is obtained.

According to another particular embodiment of the invention, at least one of the shells is mounted on a vibration device. In this way, the gap between the two shells can be periodically narrowed and widened, so that a particularly favorable separation effect between liquid and solid is obtained.

The ring, which together with the rim flange forms the sliding gap, is advantageously also mounted on a vibration device, so that the material to be concentrated is given a pulsation in the sliding gap itself. This is particularly designed to prevent the thixotropic thickening, so that clogging of the discharge gap is avoided.

In order to assist the drying effect of the apparatus or to keep certain dispersions at a prescribed temperature, the sheet metal sheels are provided with temperature-control means as known per se.

The shells can also have means, for example, holes, for the purpose of introducing a washing liquid.

The apparatus according to the invention is shown in strictly diagrammatic form in the drawing and is described more fully below. In the drawing.

Figure 1:
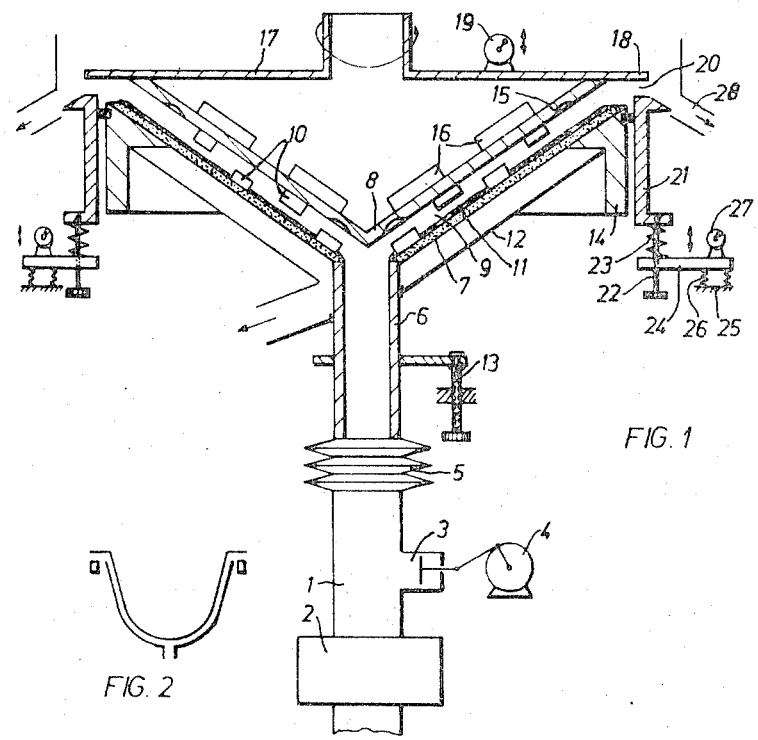
FIG. 1 shows the apparatus in longitudinal section.

Arranged in the dispersion supply pipe 1 is a high-pressure pump 2, which pumps the dispersion into the apparatus. Provided in a branch 3 of the pipe is a pulsation pump 4, which imparts a pulsating movement to the dispersion. A bellows 5 connects the dispersion supply pipe 1 to the connecting union 6 of the lower sheet shell 7, which coacts with an upper sheet shell 8 disposed coaxially above the shell 7. A gap 9 through which the dispersion moves is left between the two sheet shells 7 and 8.

The sheet shell 7 consists of sintered metal having pores of about $5\mu$. Baffle elements 10 are arranged on the shell 7 and these extend into the gap 9 and produce a required flow in the dispersion. The elements provide for the best possible development of a filter cake bed 11. The liquid to be separated out flows through the sintered metal of the shell 7 and is collected in a collecting trough 12 arranged beneath the shell 7 and discharged. The shell 7 can be raised or lowered to vary the width of the gap 9 by means of an adjustment means 13 which is arranged on the connecting union 6 and which is shown as a spindle. The sheet metal shell 7 is supported by a supporting ring 14.

The upper sheet shell is made of ordinary stainless steel sheet and likewise has baffle elements 10. In addition, depressions 15 are formed therein and its whole surface facing the gap 9 is roughened. Electric heater elements 16 are provided on the back of the shell 8. The base of the conical shell 8 is covered by a flat plate 17, which projects beyond the end of the shell 8 and in this way forms a rim flange 18. A vibration device 19 is indicated in strictly diagrammatic form on the plate 17. The complete unit consisting of the shell 8 and the plate 9, etc., is rotatably mounted and provided with a rotary drive means (not shown).

A ring 21 encloses the end of the sheet metal shell and co-operates with the rim flange 18 to form a sliding gap 20. The ring 21 is mounted so as to be adjustable in height by means of spindles 22. Springs 23 provide for the supporting action. The ring 21, together with the spindles 22 and the their bearings 24, are mounted relatively to the baseplate 25 on springs 26. Vibrations are imported to the ring 21 by a vibration device 27. The sliding gap 20 is enclosed by a channel 28 for collecting the material whose concentration has been increased.

Figure 2:
FIGS. 2 to 4 show different embodiments of the sheet shells of the apparatus.
Figures 3, 4:

FIG. 2 shows sheet metal shells in the form of a paraboloid of revolution and FIG. 3 shows the shells in the form of an ellipsoid of revolution. FIG. 4 shows the sheet metal shells in conical form, but with a step.

We claim:

1. A process for continuously concentrating a dispersion which comprises:
   (a) feeding the dispersion under pressure to the center of a filtration zone defined by vertically spaced limiting surfaces, at least one of which is perforated for passage of the dispersion radially outwardly between the plates;
   (b) rotating said dispersion by axially rotating at least one of said surfaces for relative rotation of the surfaces;
   (c) withdrawing filtrate through the perforated plate or plates and withdrawing concentrate from between said plates at the periphery thereof;
   (d) maintaining a filter cake on the perforated plate and a decreasing velocity gradient perpendicular to the limiting surfaces.

2. Process according to claim 1, the pressure of the dispersion between the plates being 0.2 to 20 atmospheres above atmospheric.

3. Process according to claim 1, the dispersion being a dispersion of a dyestuff.

4. Process according to claim 1, the dispersion being a dispersion of a plant protection agent or an insecticide.

5. Process according to claim 1, the dispersion being a dispersion of a pharmaceutical composition.

6. Process according to claim 1, the dispersion being a dispersion of a food.

7. A process according to claim 1, wherein the thickness of the filtration zone is adjustable.

8. A process according to claim 1, wherein a filter cake bed with a thickness of 0.2 to 20 mm. is maintained on the filtering limiting surfaces.

9. A process according to claim 1, wherein the thickness of the filter cake bed is altered at times by varying the speed of rotation.

10. A process according to claim 1, wherein the dispersion is subjected to a pulsation.

11. A process according to claim 1, wherein the pressure is maintained at from 2 to 5 atmospheres above atmospheric.

12. An apparatus for concentrating dispersions comprising:
   (a) two vertically spaced, horizontally and vertically extending sheet shells defining a gap therebetween; at least one shell being perforated, the sheet shells being in parallel disposition and defining an annular opening therebetween at the periphery thereof;
   (b) a centrally disposed dispersion supply pipe communicating with said gap for introducing a suspension centrally into said gap;
   (c) one of said sheet shells being mounted for axial rotation for rotation of the sheet shells relative to each other;
   (d) a rim flange attached to the periphery of one of said sheet shells and a ring attached to the other of said sheet shells defining an outlet opening for concentrate, said ring being vertically adjustable permitting adjusting of the size of said outlet opening.

13. An apparatus according to claim 12, and pump operatively mounted in said supply pipe for pumping the dispersion to between said sheet shells.

14. An apparatus according to claim 12, wherein one of the sheet shells is mounted to be vertically adjustable relatively to the other.

15. An apparatus according to claim 12, characterized in that a pulsation pump is connected to the dispersion supply pipe.

16. An apparatus according to claim 12, wherein baffle elements directed into the gap are arranged on the shells.

17. An apparatus according to claim 12, wherein the shells comprise depressions.

18. An apparatus according to claim 12, wherein those surfaces of the shells which face the gap are roughened.

19. An apparatus according to claim 12, wherein at least one of the sheet shells is provided with a vibration device.

20. An apparatus according to claim 12, wherein the ring is provided with a vibration device.

21. An apparatus according to claim 12, wherein the shells are provided with temperature-control means.

References Cited
UNITED STATES PATENTS

| | | | |
|---|---|---|---|
| 2,561,013 | 7/1951 | Coghill et al. | 210—433 X |
| 3,159,572 | 12/1964 | Ranhagen | 210—414 X |

FOREIGN PATENTS

| | | | |
|---|---|---|---|
| 881,181 | 6/1953 | Germany. | |
| 127,404 | 8/1959 | U.S.S.R. | 210—415 |

FRANK A. SPEAR, JR., Primary Examiner

F. F. CALVETTI, Assistant Examiner

U.S. Cl. X.R.

210—71, 414, 415, 433